United States Patent [19]

Eberle

[11] 4,166,210
[45] Aug. 28, 1979

[54] ELECTRODES FOR USE IN THE EXTRUSION-FUSION WELDING OF LEAD PARTS THROUGH AN APERTURE IN A BATTERY CASE

[75] Inventor: William J. Eberle, Reading, Pa.

[73] Assignee: General Battery Corporation, Reading, Pa.

[21] Appl. No.: 790,881

[22] Filed: Apr. 26, 1977

[51] Int. Cl.² ............................................. B23K 11/30
[52] U.S. Cl. ............................... 219/78.15; 219/78.16; 219/86.22; 219/119; 219/149
[58] Field of Search .................. 219/86, 22, 104, 119, 219/149, 150 R, 152, 91.3, 78.15, 78.16; 29/623.1, 623.2

[56] References Cited

U.S. PATENT DOCUMENTS

| | | | |
|---|---|---|---|
| 1,061,376 | 5/1913 | Heany | 219/119 |
| 2,024,239 | 12/1935 | McBain | 219/86.22 X |
| 2,180,396 | 11/1939 | Burke | 219/119 |
| 2,282,186 | 5/1942 | Hennininger | 219/91.23 X |
| 3,134,883 | 5/1964 | Bennent | 219/119 |
| 3,476,611 | 11/1969 | Sabatino | 136/134 |
| 3,666,912 | 5/1972 | Anderson | 219/119 X |
| 3,793,086 | 2/1974 | Badgger | 136/134 R |
| 3,869,316 | 3/1975 | Matter | 136/134 |
| 3,909,300 | 9/1975 | Schenk | 29/623.1 X |
| 4,013,864 | 3/1977 | Tiegel | 219/80 |
| 4,046,062 | 9/1977 | Matter | 29/623.1 |

Primary Examiner—Richard R. Kucia
Attorney, Agent, or Firm—Benasutti Associates, Ltd.

[57] ABSTRACT

The present invention provides a novel electrode construction for use in extrusion-fusion type battery intercell welders, which alters the current carrying characteristics of the electrodes and produces a homogeneous weld exhibiting a superior grain structure, higher strength, and superior durability.

3 Claims, 7 Drawing Figures

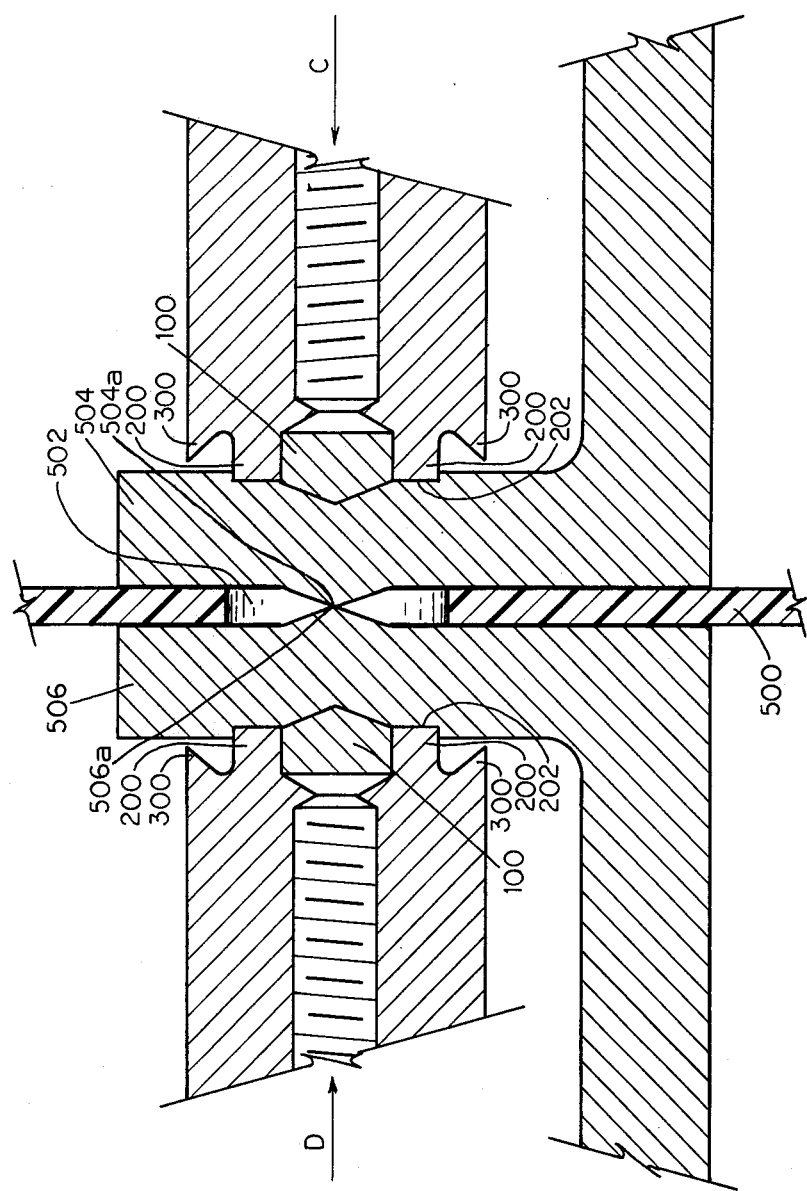

ELECTRODES FOR USE IN THE EXTRUSION-FUSION WELDING OF LEAD PARTS THROUGH AN APERTURE IN A BATTERY CASE

BACKGROUND OF THE INVENTION

The present invention relates generally to apparatuses and methods of making intercell welds in electric storage batteries, and more particularly, to those apparatuses where electrodes are oriented on either side of a partition or other aperture in a battery case, lugs or other battery parts are placed over each side of that aperture, contact produced therebetween, current passed through the lead parts to melt the same and pressure applied generally for the purpose of providing an electrical connection through the aperture. Such an apparatus is shown in U.S. Pat. No. 4,013,864.

It has long been known that lead parts on either side of a partition with an aperture formed therein can be welded through that aperture using any one of a number of techniques. In the lead acid battery art, the most common side for welding lead through an aperture is during the formation of intercell connections, that is, in making the electrical connections between one battery cell and the next and/or between the endmost battery cells and the exterior battery terminal of the battery. Since connections through apertures of this sort, in addition to being electrical, must provide a liquid seal from cell to cell to prevent "pumping", some attention has been directed in the art concerning various methods for insuring that an intercell connector, in addition to providing a good electrical connection, will also exhibit good sealing characteristics.

U.S. Pat. No. 3,687,734 generally discloses a connector for electrically connecting two elements of a storage battery through an aperture wherein at least one of the connector lugs is provided with a passage extending therethrough. Molten material from an internal portion of the connector exits through this passage during the heat fusion step as a result of pressure from a heat energy build-up. The patentee attempts by this structure to avoid the problem of blow-outs or lead expulsion which has been encountered by many practitioners in this art.

Another attempt to avoid "blow-out" is disclosed in U.S. Pat. No. 3,476,611 wherein intercell connections are made by a projection welding process from pins which extend through the partition between two adjacent battery compartments, which pins have dimensions such that, when they are fluidized during the process, the volume of the pin material does not exceed the volume defined by the walls of the opening.

Such attempts inherently involve tolerance and positioning problems during manufacture and assembly of the parts and battery. More recently, other methods have been developed for producing battery intercell electrical connections, which methods have generally been referred to as "extrusion-fusion" type methods. For example, in U.S. Pat. No. 3,793,086 a method is disclosed wherein flat surfaced connector lugs are placed on each side of the battery partition wall, adjacent an aperture. The connector lugs are extruded by a pair of opposed electrodes into the aperture until they meet, whereupon an electrical welding current is applied. When the welding current ceases, the connector is allowed to cool. U.S. Pat. No. 3,793,086 states:

"It should be emphasized that reduction of the initially applied shear force during the welding cycle is essential. If the high applied shear force is maintained during the welding cycle, molten lead will be squirted from the welding joint and an imperfect joint can result."

Another approach to the problem of blow-outs is that disclosed, for example, in Canadian Pat. No. 973,522 wherein separate hold-down sleeves are employed to clamp the lugs into sealing engagement with the partition wall aperture prior to and during the extrusion-fusion process.

In U.S. patent application Ser. No. 134,442, filed Apr. 15, 1971, referred to in U.S. Pat. No. 3,869,316, a similar process is disclosed wherein two thick plate strap lugs are clamped tightly against an intercell partition having an aperture in it, metal is extruded until contact is made, electric current is passed through the extruded metal to melt it, and, under the continuing force of the electrodes, metal is caused to flow into any voids in the aperture while, at the same time, extruding more metal out of the lugs into the aperture until the aperture is packed full of lug metal.

In U.S. Pat. No. 3,869,316 a similar extrusion-fusion system is disclosed wherein high density polyurethane pads are provided around each of the electrodes to clamp the lugs tightly against the walls of the intercell connection during the extrusion, fusion and cooling steps.

In U.S. Pat. No. 3,723,699 the problem of blow-outs or lead expulsion is expressed in a projection welding context wherein the lugs are provided with upstanding annular ribs which surround the hole in the partition wall and are caused to bite into the partition wall, in an attempt to minimize unwanted flow and providing a good mechanical key between the lugs and partition wall, thus minimizing the possibility of relative sliding movement between the lugs and partition wall.

Accordingly, as seen from the above-described prior art references, considerable problems have been experienced with blow-outs, particularly where lead is extruded into the aperture of the partition with the intent of filling the same. Extrusion-fusion welding processes have nonetheless achieved considerable success in the industry.

SUMMARY OF THE INVENTION

The present invention generally relates to a modified electrode configuration for use in an extrusion-fusion type of welding system, and more particularly, a welding system which obviates any necessity for separate clamps, or particular lug or aperture configurations, and which produces an extremely homogeneous weld with a uniform grain structure and surprising strength heretofore unknown and unachievable in battery manufacture.

The superior characteristics of the welds (and batteries produced therewith) result from numerous features incorporated in applicant's novel electrodes, and the method with which those electrodes are used. One such feature is the novel electrode tip of applicant's invention. Applicant has recognized that the upsetting portion of the electrode, that is, the tip portion which initially upsets the metal to cause the initial contact thereof within the aperture, should be of a material having a greater resistance than that of the remaining peripheral portion of the electrode, i.e., that portion of the electrode which does not punch into the center of the lug to produce the metal to metal contact. While applicant has found that superior welds are attainable using an electrically insulating material for the upsetting portion of the electrode, in the preferred embodiment, the upsetting portion is a conductor, albeit a conductor of considerably higher resistance than the remaining portion of the electrode. For example, in the preferred embodiment the electrode is made of a berylium-copper alloy, which is an extremely good conductor, while the upsetting portion of the electrode is carbide steel.

Applicant has also found that by providing an annular projection on the electrode surrounding the aperture to forge the lug around the aperture at least during the aperture-filling compression process, that the problem of blow-outs is eliminated and a substantially denser, stronger, gas-free, homogeneous weld is attained. In the preferred embodiment, the annular projection on the electrode is configured with a cutting edge which shears into the lug in order to create a sealing zone of high compression lead surrounding the aperture. The annular projection is generally concave and additionally forges lead adjacent to the high compression sealing zone towards the central axis of the aperture. The annular projection further acts as a cold heat sink for lead disposed adjacent to that portion of the electrode, to prevent the melting of same.

Applicant has found that it is not necessary to use differential pressures during the initial upsetting and subsequent compression processes. Accordingly, far greater lug, partition and aperture tolerances are established so that weld powers, hold-times and hold-pressures exhibit substantially greater latitudes than heretofore exhibited by prior art devices.

Accordingly, a primary object of the present invention is the provision of a novel battery having intercell welds exhibiting superior strength and quality.

Another object of the present invention is the provision of an apparatus for producing intercell welds in automotive storage batteries while overcoming attendant problems with blow-out.

A further object of the present invention is the provision of an extrusion-fusion type of apparatus for forming intercell welds in a lead acid storage battery wherein significantly greater lug, partition and aperture misalignments may be suitably accommodated without re-adjusting to compensate for same.

These and other objects of the present invention will become apparent from the following more detailed description.

BRIEF DESCRIPTION OF THE DRAWINGS

FIG. 2c is a greatly enlarged cross-section similar to FIGS. 2a and 2b wherein the electrodes have proceeded with the upsetting step to a point where metal to metal contact between the lugs is established within the aperture, and at which point the compression portions of the electrodes have now contacted the lug;

DETAILED DESCRIPTION OF THE DRAWINGS

Figure 1:
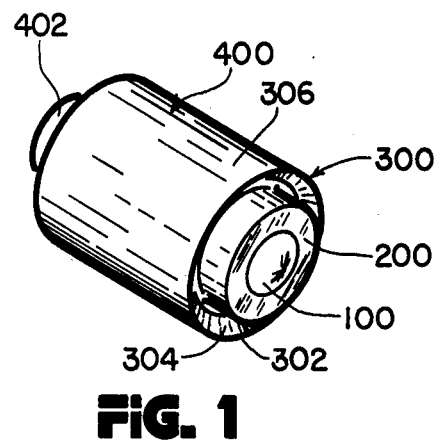
FIG. 1 is a perspective view of the preferred embodiment electrode of the present invention.

Although specific forms of the invention have been selected for illustrated in the drawings, the following description is drawn in specific terms for the purpose of describing these forms of the invention, this description is not intended to limit the scope of the invention which is defined in the appended claims.

The present invention relates to a method of welding lead or lead alloy through an aperture in the wall of a battery case, as for example, through an aperture in an intercell partition of a battery case to produce an intercell connection, or alternatively, through an exterior wall of the battery case to form a battery terminal. This method basically comprises positioning the lugs on opposing sides of the aperture to at least entirely overlap the aperture, upsetting at least a portion of the parts into the aperture to touch within the aperture, passing current through the parts to melt portions of the parts at least within the aperture, compressing at least said melted portions within said aperture to fill said aperture and forging unmelted portions of said parts surrounding said aperture at least during a portion of said compression step to prevent blow-out of said melted portion during compression.

The preferred embodiment apparatus of the present invention basically comprises an electrode with upsetting, compression and forging portions formed thereon for separately, sequentially performing the above-described steps of upsetting, compressing, and forging. In the preferred embodiment, the upsetting portion of the electrode is composed of a material with a relatively higher resistance than the compression portion of the electrode in order to produce a weld nugget of substantially greater volume.

Referring now to the drawings, and in particular to FIG. 1, the preferred embodiment electrode is illustrated in perspective and may be seen to comprise an upsetting portion 100, a compression portion 200, and a forging portion 300, each of which are on one end of cylindrical body designated generally 400 in FIG. 1. A jaw mount 402 is provided on the electrode to enable the electrode to be conveniently mounted on welding jaws. As seen in FIG. 1, in the preferred embodiment, the forging portion 300 has an interior surface 304 which is concave or beveled generally towards the central axis of the electrode, and which surface 304 terminates in a cutting edge 302 which is formed between surface 304 and the outer surface 306 of the cylindrical body designated generally 400 in the electrode.

Figure 2A:
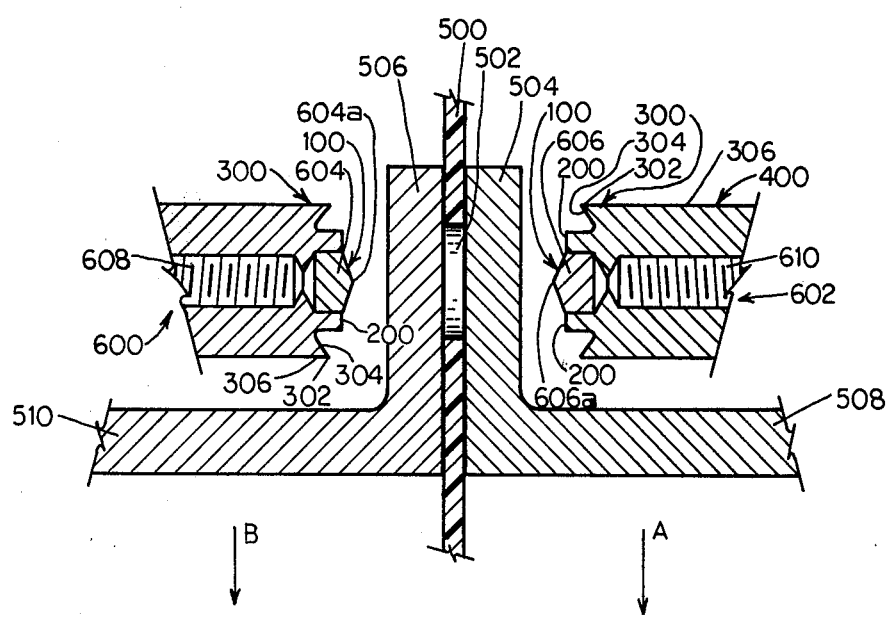
FIG. 2a is a cross-section of the portion of a battery showing flat lugs disposed on either side on a intercell partition with an aperture formed therein with two preferred embodiment electrodes similar to that illustrated in FIG. 1 above shown disposed in their standby position spaced apart from the lugs and oriented generally axially with the aperture of the partition through which the intercell connection is to be formed.

Referring now to FIG. 2a, which is a cross-section of a portion of a battery partition 500 having an aperture 502 formed therein and having lugs 504 and 506 disposed there-against to overlap aperture 502, the orientation of the electrodes designated generally 600 and 602 with respect to the aperture prior to welding is illustrated. The lugs 504 and 506 are seen to comprise generally flat surfaces which may lie up against the complementally opposing surfaces of partition 500. The lugs are selected to be of a width and height so that precise alignment with respect to the aperture is not necessary. The importance of this fact resides in part upon the fact that each lug 504 and 506 is formed or cast as part of straps 508 and 510 respectively, which, although not shown, are welded to a plurality of battery plates which make up a group of elements of the battery and which during the assembly process are slipped into the case generally in the direction shown by arrows A and B in FIG. 2a, so that portions of lugs 504 and 506 overlap the partition aperture 502.

It will also be noted from FIG. 2a that the use of lugs 504 and 506 with flat surfaces disposed thereon allow the finished groups to be inserted down into the case without fear that any particular portion of the lugs will hang up on the partition, and further without the problems attendant with projection welding techniques for first getting the groups into the battery cells and then for positioning the projections in the aperture, as more fully described for those techniques in U.S. Pat. No. 3,364,076.

As seen in FIG. 2a, the electrodes designated generally 600 and 602 are aligned substantially coaxially with aperture 502. The upsetting portions 604 and 606 of the electrodes are small, substantially cylindrical pieces, the protruding ends of which are formed into points 604a and 606a for initially contacting the lugs and for upsetting same. Threaded bores 608 and 610 are additionally provided in each electrode to receive threaded shafts for mounting the electrodes on the appropriate electrode jaws. In the preferred embodiment, the upsetting portions 604 and 606 are relatively better insulators, i.e., have a substantially higher electrical resistance than the electrode body. In particular, the compression portion, forging portion, and upsetting portions of the electrode should all be of sufficient hardness to exhibit acceptable durability during the lead and lead alloy working processes to which they are to be subjected. For this purpose, berylium copper is the preferred material from which the compression portion 200 and forging portion 300 may be milled or otherwise formed, while the upsetting portion 100 should preferably be made from a high carbon or carbide steel which is a relatively better insulator than berylium copper. Applicant has found that it is not necessary for the upsetting portion 100 to carry a substantial amount of current during the welding process. In one experimental test, for example, nylon was substituted for the steel tip utilized in the preferred embodiment to produce welds which, although not as good as those produced by the preferred embodiment, were nonetheless superior to those heretofore known to the art.

Figure 2B:
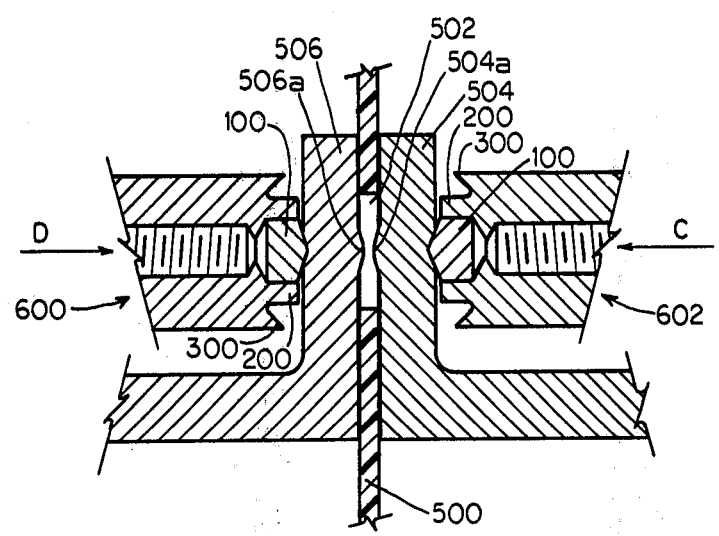
FIG. 2b is a cross-section similar to the view shown in FIG. 2a wherein the electrodes have been moved in to contact the lugs and begin to upset portions of those lugs into the aperture formed in the intercell partition.

Referring now to FIG. 2b, electrodes 600 and 602 have begun to move together in the direction of arrows C and D shown in FIG. 2b to a point where upsetting portions 100 have begun to contact lugs 504 and 506 and to upset portions 504a and 506a of those lugs into aperture 502. At the position illustrated in FIG. 2b, neither the compression portions 200 nor the forging portions 300 have yet begun to contact the lugs.

FIG. 2c, which is a greatly enlarged cross-section similar to FIG. 2b illustrates the continued movement of the electrodes together to a point where lug portions 504a have just touched within aperture 502. At this stage in the process, it should be noted that compression portions 200 of the electrodes have begun to embed themselves into the surface of the lugs by a distance sufficient to insure that these compression portions 200 will have established a good electrical contact with the exterior surfaces of lugs 504 and 506. Accordingly, the leading surface 202, which is substantially perpendicular to the axis of the aperture and which is of a diameter approximately equal to the aperture, is spaced behind the leading point of the upsetting portion 100 by a distance somewhat less than half of the thickness of the partition through which the intercell connection is to be made. Accordingly, it may be seen that for this phase of the process, the relative thickness of the lugs 504 and 506 are immaterial to the proper functioning of the upsetting portions 100 and compression portions 200 will always produce a suitable electrical contact with the lug by the time upset portions 504a and 506a meet within the partition aperture.

Figure 2D:
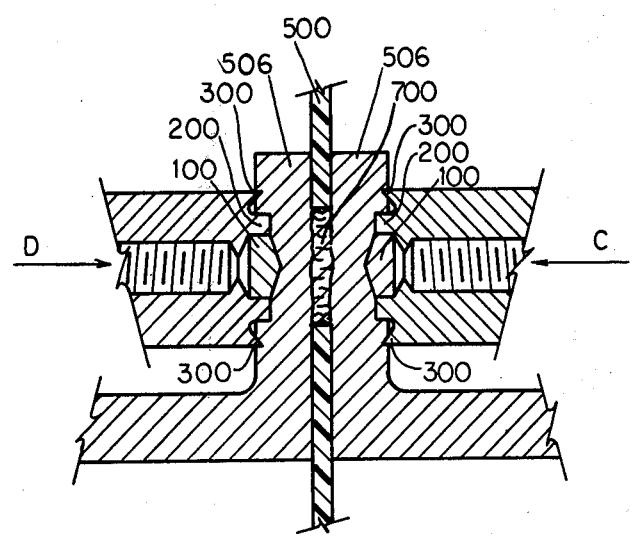
FIG. 2d is a cross-section similar to FIGS. 2a and 2b wherein fluidization of lead within the aperture has been effected and the electrodes brought further together so that the molten metal fills the hole and the foregoing portions engage the lug faces.

Beginning at the time that metal to metal contact is established between lug portions 504a and 506a, a current is applied by the electrodes through the lugs in order to fluidize the lead within the aperture. In the preferred embodiment, current is applied immediately upon the establishment of metal to metal contact within the aperture and the movement of the electrodes together continues in a smooth and uninterrupted fashion as shown in FIG. 2d wherein it may be seen that the compression portions 200 of the electrode, in combination with the upsetting portions, have continued to move together to force the lead to completely fill the aperture in partition 500. In FIG. 2d, molten lead 700 is shown almost completely filling the aperture just prior to completion of the welding cycle. As the aperture is being filled with lead, but prior to the time that aperture is completely filled with lead, the forging portions 300 come in contact with the exterior surfaces of lugs 504 and 506 as shown in FIG. 2d. In the preferred embodiment, it is desired that the forging portions 300 of the electrode not penetrate the lugs so deeply as to cause structural weaknesses (or subsequent corrosion) of those lugs, but yet that the leading cutting edge of those forging portions contact the exterior surfaces of the electrodes at least prior to the complete filling of the aperture under compression as a result of the opposing movement of the remaining portions of the electrode phase.

At the present time, it is not fully understood how the forging portions 300 act within this environment to eliminate problems of blow-out. It is theorized that the annular cutting edge 302 which surrounds the aperture produces an annular zone of high compression lead which acts as a seal preventing lead expulsion from the weld zone. It is further theorized that the beveled or concave surface 304 of the forging portion, in acting to form or force that portion of the lug interiorally adjacent the cutting edge towards the weld zone sets up stresses internally within the lug which additionally act to confine the weld nugget to prevent expulsion. Finally, the depth of the groove formed between the forging portion 300 and compression portion 200 is believed to provide a certain degree of relief for lead squeezed between the electrodes, and that lead may actually be forged up into the annular groove in the electrode rather than be expulsed from the weld zone.

Figure 2E:
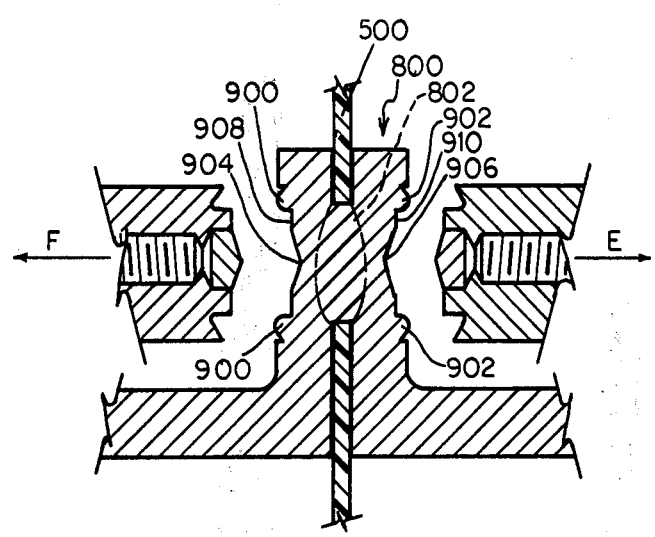
FIG. 2e is a cross-section similar to FIGS. 2a-2d wherein the connection is complete and the electrodes have been withdrawn therefrom, showing the completed weld configuration.

Referring now in particular to FIG. 2e, wherein the electrodes are being withdrawn in the directions E and F to reveal a finished weld, it may be seen that the final intercell connection designated generally 800 is extremely homogeneous and completely lacks any air pockets or "worm holes" which typify welds produced by prior art processes. At the present time, it is also not understood why the process and apparatus of the present invention consistantly produce weld nuggets which, upon sectioning and etching to show grain structure, exhibit an extremely wide weld zone 802 which is generally disposed in the configuration shown in FIG. 2e. It is generally theorized that a larger weld zone is encouraged by applying the bulk of current to the weld zone through the peripheral portions of the electrode, and that in prior art devices where the entire electrode, including upsetting portions, were constructed from the same highly conductive materials that the bulk of the current passing through the welds was supplied through the path of least resistance, namely the path between the tips of each upsetting portion. It is believed that by using a somewhat conductive, but substantially more resistant material to form the upsetting portions of the electrode that the current flow is equalized across the face of the electrodes and that a substantially larger melting and weld zone is, accordingly, established.

Figure 2F:
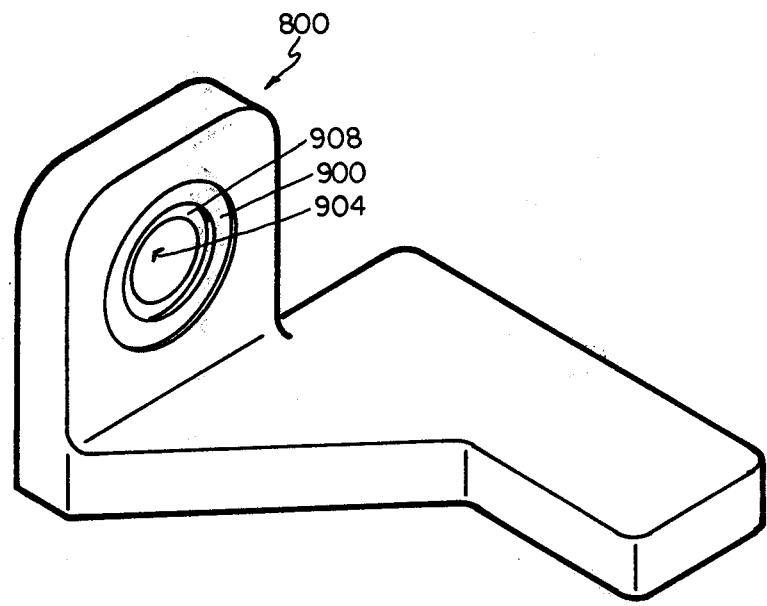
FIG. 2f is a perspective view of a strap and lug showing the external appearance of a lug in which an intercell connection in accordance with the present invention has been made.

In FIG. 2e and FIG. 2f, the final configuration of the intercell connection produced by the method and apparatus of the present invention is clearly illustrated. This intercell connection is, as aforesaid, characterized by a large uniform weld nugget 802 which is disposed to completely fill the aperture within partition 500. Annular beads 900 and 902 which have been formed by the forging portion of the electrodes and adjacent to the compression portions of those electrodes are seen encircling the center of the connection, while central depressions 904 and 906 are disposed in the center of the intercell connection and are joined to the annular beads by flat annular rings 908 and 910. In order to determine the comparative strengths of the intercell weld illustrated in FIG. 2e, the weld produced by the method described above was tested against conventional welds produced by a convention berylium cooper "stepped electrode" apparatus. Tests were conducted on standard lead antimony lugs which were welded with similar currents through partition apertures. Since it is known that lead antimony alloys harden as they age, comparative shear testing using conventional shear testing techniques were utilized in order to determine the comparative strengths of "fresh", quenched, and overnight "cured" or "aged" welds. In all instances a 3¼ inch air cylinder was utilized in order to provide shearing force across a lug on one side of the partition while the lug on the other side of the partition was held rigidly. The values obtained by these tests represent the air pressure supplied to the 3¼ inch cylinder, and, accordingly, are proportional to the pounds of shear force applied to each intercell connection in order to break the same. Fresh intercell connections produced from the conventional stepped electrodes were found to shear generally at between 75 and 80 pounds of air pressure, although certain of the fresh intercell connections tested sheared at values as low as 50 pounds of pressure. By comparison, fresh intercell connections produced by the method and apparatus of applicant's invention generally sheared uniformly between about 150 and 152 pounds of pressure. A cold water quench of the intercell welds produced by applicant's invention increased this value to approximately 160 pounds of pressure required to shear the same. Intercell connections produced and aged for at least several weeks were tested and it was found that these "aged" or "cured" welds produced from the standard "stepped electrode" sheared at about 180 pounds of pressure. The intercell welds produced by applicant's method and apparatus, however, sheared at approximately 280 pounds of pressure after aging overnight. Upon further aging, many of these intercell welds approached 300 to 320 pounds. Of particular importance it was found that when shear did occur in these ranges, the shear did not normally occur at a point within the aperture, but rather that the boundary between the weld nugget and the remaining portion of the lug, thereby indicating that the weld nugget was, itself, extremely homogeneous; a fact which has been confirmed by sectioning and etching the weld nuggets, as mentioned aforesaid.

Accordingly, applicant's invention provides an extremely simple and reliable method of making intercell welds which is not sensitive to dimensional irregularities in the lugs to be welded or the precise alignment of those lugs with respect to the aperture through which the intercell partition is to be made.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In an apparatus having electrodes for extruding and electrically fusing lead parts through an aperture in a lead-acid battery case to form a connection therethrough, said aperture having a substantially flat surface region disposed around the perimeter thereof, the improvement wherein said electrode comprises a forging means for deforming the lead generally surrounding said aperture adjacent said flat surface region to thereby prevent expulsion of molten metal compressed within said aperture, said forging means comprising a generally annular cutting edge.

2. In an apparatus having electrodes for extruding and electrically fusing lead parts through an aperture in a lead-acid battery case to form a connection therethrough, said aperture having a substantially flat surface region disposed around the perimeter thereof, the improvement wherein the electrode comprises a forging means for deforming the lead generally surrounding said aperture adjacent said flat surface region, said forging means comprising an interior surface for forcing lead generally towards the center of said aperture, said surface being a concave surface, to thereby prevent expulsion of molten metal compressed within said aperture.

3. In an apparatus having electrodes for extruding and electrically fusing lead parts through an aperture in a lead-acid battery case to form a connection therethrough, said aperture having a substantially flat surface region disposed around the perimeter thereof, the improvement wherein said electrode comprises a forging means for deforming the lead generally surrounding said aperture adjacent said flat surface region, said electrodes further comprising means for upsetting said lug and for compressing lead within said aperture to fill said aperture, said forging means being generally concentric to and spaced apart from said upsetting and compression means, said forging means being generally spaced behind the leading edges of said upsetting and said compression means to contact said lug prior to the filling of said aperture with material, to thereby prevent expulsion of molten metal compressed within said aperture.

* * * * *